United States Patent [19]

Black, Jr. et al.

[11] Patent Number: 4,899,088
[45] Date of Patent: Feb. 6, 1990

[54] POWER CONTROL CIRCUIT FOR INDUCTIVE LOADS

[75] Inventors: Robert A. Black, Jr., Brooklyn Park; Arlon D. Kompelien, Cross Lake, both of Minn.

[73] Assignee: Honeywell Inc., Minneapolis, Minn.

[21] Appl. No.: 239,209

[22] Filed: Aug. 31, 1988

[51] Int. Cl.$^4$ ............................................. H05B 41/36
[52] U.S. Cl. ................................ 315/291; 315/DIG. 4
[58] Field of Search .......... 315/291, 307, 308, DIG. 4

[56] References Cited

U.S. PATENT DOCUMENTS 4,701,680  10/1987  Alley et al. ..................... 315/307 X Primary Examiner—David Mis
Attorney, Agent, or Firm—Kinney & Lange

[57] ABSTRACT

A circuit for use with the dimming control of a fluorescent light in which a "notch" is created and positioned to vary the power to the inductive ballast and the circuit including a pair of gate turn-off thyristors operable to supply a current path for stored energy in the inductive ballast only during the notch.

24 Claims, 1 Drawing Sheet

POWER CONTROL CIRCUIT FOR INDUCTIVE LOADS

BACKGROUND OF THE INVENTION

1. Field of the Invention

The present invention relates to power control for inductive loads and, more particularly, to a circuit for providing reliable power saving dimming of fluorescent lights.

2. Reference to Other Applications

Two other patent applications filed in the name of the present inventors, and assigned to the present assignee, entitled "Notch Cutting Circuit with Minimal Power Dissipation" and "Time Delay Initialization circuit," respectively, have been filed on even date herewith and disclose and claim circuitry useful in cooperation with the present invention.

DESCRIPTION OF THE PRIOR ART

In a co-pending application Ser. No. 898,569, filed Aug. 21, 1986, in the name of L. S. Atherton, R. A. Black, Jr., and A. D. Kompelien, and assigned to the assignee of the present invention, a circuit is described which provides fluorescent light dimming by creating a "notch" and controlling the width and position thereof along the alternating waveform produced by the power supply used to energize the fluorescent light. In this copending application, the power to the inductive ballast of a fluorescent light is interrupted for a short period of time on both the positive and negative half cycles of the power supply to provide a voltage waveform with a "notch" in each half cycle. The position and width of the "notches" operate to vary the power supplied to the ballast and thus provide the desired dimming. In order to provide a current path for the stored energy in the inductive load during the "notch" time when the energy to the load is interrupted, a parallel switch is employed that operates during the "notch" to permit the stored energy to continue circulating and dissipate. This parallel switch is shown in FIG. 5B of the above-mentioned co-pending application, and generally comprises a pair of silicon controlled rectifiers (SCR's) connected across the load and in parallel with a pair of diodes. The poling of the diodes and SCR's is such as to prevent a short circuit from the power supply during normal operation, but to nevertheless provide a current path during the "notch". The SCR's are operated by signals derived from the power supply with the result that one of the SCR's is turned "on" during positive half cycles and the other is turned "on" during negative half cycles. The difficulty with this circuit is that the logic derived from the AC source supplies drive power for each of the SCR's during substantially its entire half cycle, when it may have to provide the load current path, and since the SCR control drive consumes considerable power, there is considerable waste of energy because they actually need to be "on" only during the "notch". Furthermore, with SCR's, an abnormal surge of reverse voltage across the supply could operate to turn the wrong SCR "on" and thus provide an undesirable short circuit path across the load.

SUMMARY OF THE INVENTION

The present invention provides a path for stored energy in an inductive load by use of a pair of "gate turn-off" thyristors (GTO's) connected in parallel with a pair of diodes across the inductive load in a manner uniquely different to that described in the above-mentioned co-pending application. GTO's have the advantage that they may be turned "on" and "off" so that they can be shut "off" except during the "notch" period when each is turned "on". Since they are "off" during a major portion of the power supply cycle, a considerable power saving is effected, and a strong surge of reverse voltage across the power supply will not inadvertently turn the GTO's "on", thus preventing a short circuit situation. The gates of the GTO's are energized though a novel circuit effective to turn the proper GTO "on" at the beginning of the "notch" and to turn it "off" at the end thereof.

DETAILED DESCRIPTION OF THE PREFERRED EMBODIMENTS

Figure 1:
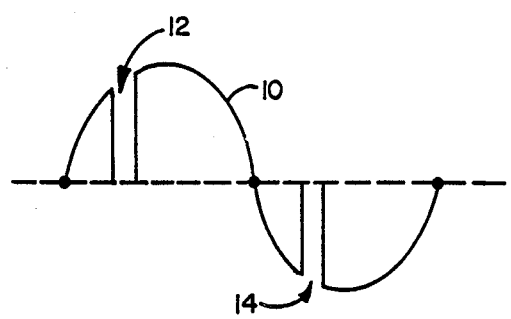
FIG. 1 shows the desired load voltage waveform including the "notches" to provide dimming to the inductive ballast of a fluorescent light.
Figure 2:
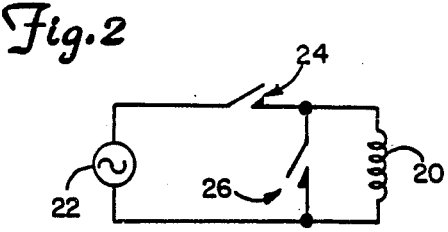
FIG. 2 is a simplified switching circuit to show the desired operation for controlling the power to the inductive load.

In FIG. 1, a sinusoidal voltage waveform 10 is shown which may be obtained from a power source used to supply the inductive ballast of a fluorescent light, the brightness of which is to be controlled. As described in the above-mentioned co-pending application, the dimming control for the fluorescent light may be provided by creating "notches" such as 12 and 14 in the waveform 10 and by adjusting their width and positioning them along the horizontal axis in such a manner that they reduce the power to the ballast to provide dimming of the fluorescent light. A simplified description of the operation will be obtained by reference to FIG. 2 in which an inductive load 20, representing the ballast of a fluorescent light, is shown connected to a power source 22 through a first switch 24 which is operated from a control circuit (not shown herein but which may be like that shown in the above-mentioned co-pending application and the above-referenced applications filed on even date herewith) to disrupt the flow of current to inductive load 20 during those times when the notches 12 and 14 are desired.

A second switch 26, is shown connected in parallel with load 20 to provide a path for the stored energy in the inductive load 20 during the times when switch 24 is open. Accordingly, switch 26 will be energized to a closed position by apparatus (not shown herein), during only those times when switch 24 is open. In this way, it is seen that energy stored in the inductive load 20 during "on" times of switch 24 has a dissipating path through switch 26 during "off" times of switch 24.

Figure 3:
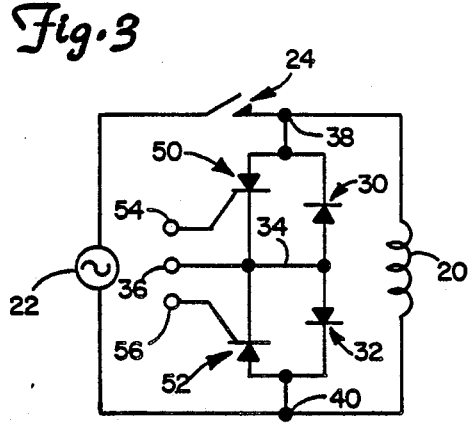
FIG. 3 is a simplified showing of the prior art circuit which provides a current path for the stored energy during the "notch;"

In FIG. 3, a simplified switching arrangement which provides the conductive path for the stored energy as described in the above-mentioned application is shown. In FIG. 3, the load 20 is again shown connected to be supplied with power from a source 22 through a first switch 24. A pair of diodes 30 and 32 are shown with their anodes connected together to a common line 34 which normally is connected to signal ground through a terminal 36 and with their cathodes connected across the inductive load 20 at terminals 38 and 40, respectively.

A pair of unidirectional switches, preferably SCR's, 50 and 52 are also shown connected across inductive load 20 with their cathodes connected together to common line 34 and with their anodes connected to terminals 38 and 40, respectively. The control gates of SCR's 50 and 52 are shown connected to terminals 54 and 56, respectively, to receive signals from circuitry (not shown herein but which may be like that shown in the above-mentioned co-pending application and the above-referenced applications filed on even date herewith) so as to turn the SCR 50 to an "on" condition at the proper time during negative half cycles of the power from source 22 and to turn SCR 52 to an "on" condition at the proper time during positive half cycles. Thus, during substantially the entire positive half cycles SCR 50 will not permit current flow downwardly from terminal 38 since it is in an "off" condition and, similarly, during substantially the entire negative half cycles, SCR 52 will not permit current flow upwardly from terminal 40 since it is in an "off" condition. In this previous circuit, however, a drive signal is presented at terminal 56, the gate of SCR 52, for the entire positive half cycle so it is ready to conduct during the "notch" time. This then creates a path for current flow only in the direction from the bottom of inductive load 20 through terminal 40, upwardly through SCR 52, through the common line 34, and through diode 30, terminal 38, to the upper part of inductive load 20 during this half cycle. Similarly, during a negative half cycle, a drive signal is presented to terminal 54, the gate of SCR 50, for the entire negative half cycle so it is ready to conduct during the "notch" time. This then creates a path for current flow only in the direction from the top of inductive load 20, through terminal 38, downwardly through SCR 50, through the common line 34, and through diode 32, terminal 40, to the bottom of inductive load 20 during this half cycle. It is seen that a path for the stored energy to inductive load 20 is therefore provided whenever the switch 24 is opened. The difficulty found with the circuit of FIG. 3 and its previous associated control circuit is that the SCR's 50 and 52 have gate signal power during a large portion of each half cycle and thus considerable power is used when not needed. With these SCR's, the possibility also exists for a large surge voltage to cause the wrong SCR to come "on" during one half cycle of power and cause a short of the power source.

Figure 4:
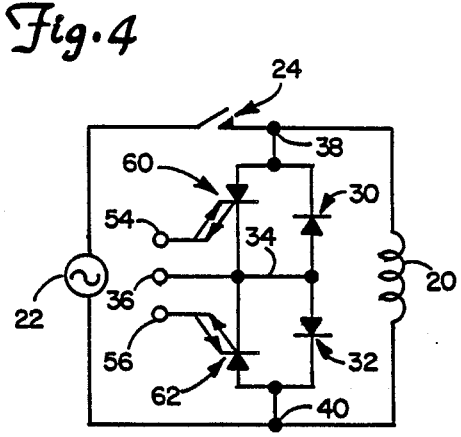
FIG. 4 shows a circuit similar to FIG. 3 but utilizing the GTO's of the present invention.
Figure 5:
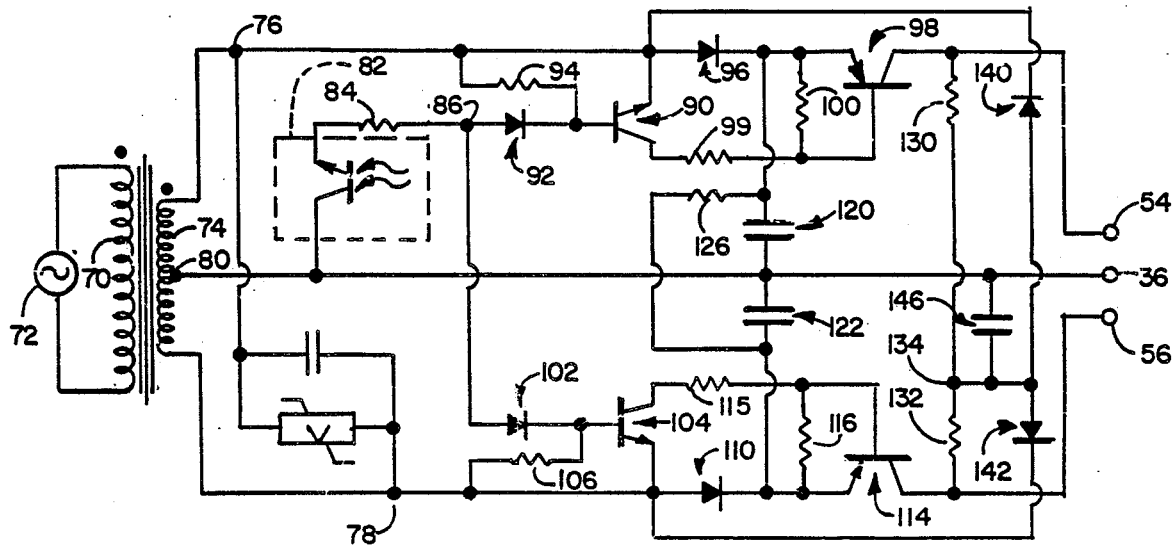
FIG. 5 shows a schematic diagram of a novel control circuit for gating the GTO's of FIG. 4.

The circuit of FIG. 4, in conjunction with the control circuit shown in FIG. 5, shows the present invention which solves the power dissipation and possible power source shorting problem. A pair of unidirectional switches, preferably GTO's, 60 and 62 are provided in place of the SCR's 50 and 52 of FIG. 3. While SCR's and GTO's are the preferred type of unidirectional switches for use in the present invention, other switches such as insulated gate transistors, bipolar transistors and field-effect transistors might be employed with less effective results. GTO's are lower power dissipation than the others and can be turned both "on" and "off", and SCP's are the only switches which block reverse voltages in both directions presently known to applicants. All of the other elements of FIG. 4 are the same as in FIG. 3 and carry the same reference numerals. The gate of GTO's 60 and 62 are shown as a double arrow connected to control terminals 54 and 56, respectively, so as to show that the GTO's 60 and 62 may be turned both "on" and "off". More particularly, by a circuit which will be described in connection with FIG. 5, GTO 62 will be turned "on" at, or slightly before, the beginning of notch 12 of FIG. 1 and will be turned "off" at the end of notch 12. Similarly, GTO 60 will be turned "on" at or slightly before the beginning of notch 14 of FIG. 1 and will be turned "off" at the end of notch 14. By this means, the same paths as described in connection with FIG. 3 are provided to dissipate the energy stored in inductive load 20 and since the GTO's are provided an "on" drive signal for only the short period of time that the notch is present, there is no wasted power. It is preferred that notches be cut in both the positive and negative half cycles because otherwise a DC bias signal is developed which causes undesirable flickering in the fluorescent lamp.

Turning now to FIG. 5, a circuit for controlling the "on" and "off" conditions of GTO's 60 and 62 will be described. In FIG. 5, the source of power is shown as a transformer having a primary winding 70 connected across an alternating current source 72 and a secondary winding 74 having end terminals 76 and 78 and a center tap terminal 80. An "optocoupler" circuit, shown by dashed line 82, and which may be the same as that described in the above-mentioned co-pending application, is shown having a first terminal connected to the common center tap 80 of transformer secondary winding 74 and having a second terminal connected through a current limiting resistor 84 to a junction point 86.

A npn transistor 90 is shown with its base connected to the cathode of a diode 92 whose anode is connected to the junction point 86 and a resistor 94 is connected between end terminal 76 of secondary transformer winding 74 and the base of transistor 90. The emitter of transistor 90 is connected to the end terminal 76 and to the anode of a diode 96 whose cathode is connected to the emitter of an pnp transistor 98. The collector of transistor 90 is connected to the base of transistor 98 through a resistor 99 and a resistor 100 is connected between the emitter and base of transistor 98.

Another diode 102 is shown with its anode connected to the junction point 86 and its cathode is connected to the base of a second npn transistor 104. The base of transistor 104 is connected through a resistor 106 to the end terminal 78 of transformer secondary winding 74. The emitter of transistor 104 is connected to the end terminal 78 and to the anode of a diode 110 whose cathode is connected to the emitter of a second pnp transistor 114. The collector of transistor 104 is connected to the base of transistor 114 through a resistor 115 and a resistor 116 is connected between the emitter and base of transistor 114.

A pair of capacitors 120 and 122 have a first electrode connected together to the center tap 80 of transformer secondary winding 74 and a second electrode connected to the emitters of transistors 98 and 114, respectively. A resistor 126 is connected across capacitors 120 and 122.

A pair of resistors 130 and 132 each have one end terminal connected to a junction point 134 and have their other end terminals connected to the collectors of transistors 98 and 114, respectively. A pair of diodes 140 and 142 have their anodes connected together to the junction point 134 and have their cathodes connected to the end terminals 76 and 78 of transformer winding 74, respectively. A capacitor 146 is connected between the junction point 134 and the center tap 80 of transformer secondary winding 74.

The terminals 54, 36 and 56 shown in FIG. 4 are also shown in FIG. 5 at the right end thereof with terminal 36 being connected to the center tap 80 of secondary winding 74, and terminals 54 and 56 connected to the collectors of transistors 98 and 114, respectively.

In operation, during a positive half cycle of a signal from generator 72, an output will appear on junction points 76, 80 and 78 of transformer secondary winding 74 such that the voltage at point 76 will be positive with respect to the voltage at point 80, and the voltage at point 80 will be positive with respect to the voltage at point 78. This will provide a flow of current from junction point 76 through diode 96 and capacitor 120 to junction point 80 thereby charging capacitor 120 with its upper electrode positive. Also during the positive half cycle, capacitor 146 is charged so that its upper terminal is positive by a flow of current from center tap 80 through capacitor 146 and diode 142, back to the lower end terminal 78 of secondary winding 74.

At a predetermined time during a positive half cycle when it is desired to create notch 12 of FIG. 1, an optoelectric signal will be presented by circit 82 to create a positive signal (with respect to end terminal 78) at junction point 86. This will produce a current flow through diode 102 and resistor 106 thereby biasing transistor 104 to an "on" condition. Transistor 90 will remain in an "off" condition. When transistor 104 is "on", a bias is supplied to transistor 114 turning it "on". The positive voltage stored on capacitor 122 (from the previous half cycle as will be explained) may now flow through transistor 114, resistor 132, common junction 134 and diode 142 back to end terminal 78 of transformer secondary winding 74. Also, as capacitor 122 discharges, there is a sustaining path for current flow through resistor 132 which is from terminal 76 of transformer winding 74 through diode 96, resistor 126, transistor 114, then through resistor 132 and back through diode 142 to end terminal 78 of the transformer winding. This produces a positive signal at terminal 56 and, accordingly, the GTO 62 of FIG. 4 is turned "on". In actual practice, the signal from optocoupler circuit 82 at terminal 86 is created slightly in advance of the beginning edges of the "notches" 12 and 14 of FIG. 1 so that GTO 62 of FIG. 4 is turned "on" just slightly before the "notch" begins to assure it is "on" when the switch 24 opens. The stored charge on load 20 may now drain through junction point 40, GTO 62, common terminal 34, diode 30, junction 38 and back to the upper terminal of load 20.

At the end of notch 12, the signal from optocoupler circuit 82 at junction point 86 disappears and, accordingly, transistor 104 stops conducting as does transistor 114.

Remembering that capacitor 146 has been charged with its upper terminal positive during the positive half cycle of operation, its lower terminal will be negative and the negative voltage on common terminal 134 now operates through resistor 132 to drive gate 56 of GTO 62 negative thereby turning it "off". Accordingly, the GTO 62 will remain "on" only during the period of the notch 12 of FIG. 1.

During a negative half cycle of operation, end terminal 78 will be positive with respect to center tap 80 and center tap 80 will be positive with respect to end terminal 76. Under these conditions, current will flow from terminal 78 through diode 110 and capacitor 122 to center tap 80 thereby charging capacitor 122 to a positive voltage on its lower terminal. Current will also flow from center tap 80 through capacitor 146 to common terminal 134 and through diode 140 back to upper terminal 76 of secondary winding 74 thereby recharging capacitor 146 back up to a condition with a positive voltage on its upper terminal.

Slightly before a notch is desired, a signal from the optocoupler circuit 82 will provide a positive signal (with respect to the upper end terminal 76 of transformer secondary winding 74) at junction point 86. The positive signal at junction point 86 will now operate through diode 92 and resistor 94 to provide a flow of current which biases transistor 90 to an "on" condition. Transistor 104 will remain "off". With transistor 90 "on", transistor 98 will be biased to an "on" condition and current will now flow from capacitor 120, which retains its positive charge from the previous cycle, through transistor 98, resistor 130, common junction 134 and diode 140 back to the now negative terminal 76 of transformer secondary winding 74. Also, as capacitor 120 discharges, there is a sustaining path for current flow through resistor 130 which is from terminal 78 of transformer winding 74, through diode 110, resistor 126, transistor 98, then through resistor 130 and back through diode 140 to end terminal 76 of the transformer winding. The positive voltage created at terminal 54 will thus gate GTO 60 of FIG. 4 to an "on" condition and the stored charge on load 20 of FIG. 4 may now drain through junction point 38, GTO 60, common terminal 34, diode 32, junction 40, and back to the lower terminal of load 20.

At the end of the "notch", the signal from optocoupler circuit 82 disappears from junction point 86 and transistors 90 and 98 are turned "off". The negative signal on the lower terminal of capacitor 146 now operates through resistor 130 to drive terminal 54 and the gate of GTO 60 to a negative Potential thereby turning GTO 60 "off". Accordingly, GTO 60 is only "on" during the notch 14.

It is therefore seen that we have provided a circuit which will create a dissipation path for an inductive load only during a "notch" and not during the full half cycle of the power supply. Furthermore, since GTO's are able to be turned "off" and have a turn-off signal when they must be "off", a powerful line transient will not accidentally turn them "on", thus preventing an unwanted short circuit.

Although the present invention has been described with reference to a preferred embodiment, workers skilled in the art will recognize that changes may be made in form and detail without departing from the spirit and scope of the invention.

What is claimed is:

1. Apparatus for use with an inductive load having first and second terminals and which is normally supplied with alternating current by a source connected to the first and second terminals but which may be interrupted from connection with the source for predetermined time periods during the Positive and negative portions of the current supplied, the apparatus operable to provide a current path, only during the predetermined time periods, for any accumulated charge in the load comprising:

first and second unidirectional conductors each poled to conduct current from an input to an output terminal thereof;

first and second unidirectional switches each having a control terminal operable upon receipt of control signals to turn the switches "on" and "off", each switch being poled to conduct current from an input terminal to an output terminal thereof only when activated to an "on" condition by a control signal at the control terminal;

control means operable to produce a first output during substantially only the predetermined time periods occurring in the positive portions of the current supplied by the source and a second output during substantially only the predetermined time periods occurring in the negative portions of the current supplied by the source; and connection means connecting the output terminals of the first and second conductors and the input terminals of the first and second switches to the first and second terminals of the load, respectively, connecting the input terminals of the first and second conductors to the output terminals of the first and second switches and connecting the control terminals of the first and second switches to the control means, the first output of the control means providing the control signal to turn the second switch "on" and the second output of the control means providing the control signal to turn the first switch "on".

2. Apparatus according to claim 1 wherein the inductive load comprises fluorescent lamp means and the predetermined time periods are for dimming the light therefrom.

3. Apparatus according to claim 1 wherein the unidirectional conductors are diodes.

4. Apparatus according to claim 1 wherein the unidirectional switches are GTO's.

5. Apparatus according to claim 1 wherein the first and second outputs from the control means are electrical signals starting proximate the beginning of the predetermined time periods and ending proximate the end of the predetermined time periods.

6. Apparatus according to claim 5 wherein the control means includes:

a transformer secondary inductively coupled to the source and having first and second end terminals an a center terminal;

first capacitive means storing a positive signal during positive portions of the current supplied by the source;

second capacitive means storing a positive signal during negative portions of the current supplied by the source;

first switch means actuated proximate the start of a predetermined time period and deactivated proximate the end of a predetermined time period operable to connect the first capacitor means to supply the first output; and second switch means actuated proximate the start of a predetermined time period operable to connect the second capacitor means to supply the second output.

7. Apparatus according to claim 6 wherein the first and second switches comprise transistors.

8. Apparatus according to claim 7 further including:

optical means to produce an optical signal proximate the beginning of predetermined time periods and extinguishing proximate the end of predetermined time periods; and means responsive to the optical signal to produce bias signals to turn "on" the transistors.

9. Apparatus according to claim 8 wherein the means responsive to the optical signal comprises third and fourth switches connected to the first and second switches, respectively.

10. A control system for use with a fluorescent lamp energized from an alternating voltage source having positive and negative half cycles with respect to a reference potential, the system being responsive to input signals occurring at predetermined times to produce control signals to dim the lamp, a control signal being produced at a first terminal when an input signal occurs during a positive half cycle and a control signal being produced at a second terminal when an input signal occurs during a negative half cycle comprising:

storage means connected to the source to store the control signal;

first switch means connected to the source and energizable by an input signal only during positive half cycles to connect the storage means to the first terminal to supply the control signal thereto; and second switch means connected to the source and energizable by an input signal only during negative half cycles to connect the storage means to the second terminal to supply the control signal thereto.

11. Apparatus according to claim 10 wherein the source includes oppositely poled output terminals and the storage means includes capacitive means connected to the output terminals.

12. Apparatus according to claim 11 wherein the output terminals are first and second taps on a transformer secondary winding and the reference potential is derived from a mid-tap on the secondary winding between the first and second taps.

13. Apparatus according to claim 12 wherein the capacitive means includes first and second capacitors each having first and second electrodes and including connecting means connecting the mid-tap to the first electrodes and connecting the first and second taps to the second electrodes, respectively.

14. Apparatus according to claim 13 wherein the connecting means includes unidirectional current flow means connected between the first and second taps and the second electrodes.

15. Apparatus according to claim 14 further including resistance means connected between the second electrode of the first capacitor and the second electrode of the second capacitor.

16. Apparatus according to claim 10 wherein the first and second switch means include first and second transistor means each having a base electrode connected to receive the input signal.

17. Apparatus according to claim 16 further including third switch means having a switch input connected to the reference potential and a switch output and first connection means connecting the switch output to the base electrodes of the first and second transistor means, respectively, to supply the input signal.

18. Apparatus according to claim 17 wherein the first connection means includes first and second unidirectional current flow means poled to allow current flow from the switch output to the base electrode of the first and second transistor means, respectively.

19. Apparatus according to claim 18 wherein the first and second pnp transistors each have an emitter electrode connected to one of the first and second taps, respectively, and each having a collector electrode.

20. Apparatus according to claim 19 wherein the first and second transistor means includes third and fourth transistors each having a base electrode connected to the collectors of the first and second transistors, respectively 21. Apparatus according to claim 20 wherein the third and fourth transistors each have an emitter electrode and a collector electrode, the second connection means connecting the emitter electrode to the first and second taps, respectively, and connecting the collector electrode to the first and second terminals, respectively.

22. Apparatus according to claim 21 wherein the second connection means includes third and fourth unidirectional current flow means connected to provide current flow from the first and second taps, respectively, to the emitters of the third and fourth transistors.

23. Apparatus according to claim 22 wherein the storage means includes first and second capacitors each having first and second electrodes and third connection means connecting the first electrodes to the reference potential and connecting the second electrodes to the emitter of the third and fourth transistors, respectively.

24. Circuit means for producing an output signal with respect to a reference potential at first and second terminals during both positive and negative portions of an alternating cycle during predetermined times so that (1) when a predetermined time occurs during a positive portion of the cycle the circuit means produces an output which is positive with respect to the reference potential at the first terminal and negative with respect to the reference potential at the second terminal, and (2) When the predetermined time is during a negative portion of the cycle, producing an output which is positive With respect to the reference potential at the second terminal and negative with respect to the reference potential at the first terminal, comprising:

transformer means having a reference potential center tap and first and second end taps to produce the alternating cycle;

diode means having anodes connected together at a common junction and having cathodes connected through first and second resistors to the first and second end taps, respectively;

first npn transistor means having a base connected to the junction of the cathode of the first diode and the first resistor, having an emitter connected to the first end tap and having a collector;

second npn transistor means having a base connected to the junction of the cathode of the second diode and the second resistor, having an emitter connected to the second end tap and having a collector;

first pnp transistor means having a base connected to the collector of the first npn transistor means, having an emitter connected to the cathode of a third diode the anode of which is connected to the first end tap and having a collector connected to the second terminal;

second pnp transistor means having a base connected to the collector of the second npn transistor means, having an emitter connected to the cathode of a fourth diode the anode of which is connected to the second end tap and having a collector connected to the first terminal;

first and second capacitor means having a common junction connected to the center tap and each having a second terminal connected to the cathodes of the third and fourth diodes, respectively;

fifth and sixth diodes having a common junction connecting their anodes and each having a cathode connected to the first and second end taps, respectively;

third and fourth resistors each having a first end connected to the common junction of the fifth and sixth diodes and each having a second end connected to the first and second terminals, respectively;

third capacitor means having a first end connected to the center tap and a second end connected to the common junction of the fifth and sixth diodes; and control means connected between the center tap and the common junction of the first and second diodes to electrically connect the center tap to the common junction during the predetermined times.

* * * * *

UNITED STATES PATENT AND TRADEMARK OFFICE
CERTIFICATE OF CORRECTION

PATENT NO. : 4,899,088　　　　　　　　　　　　Page 1 of 2

DATED : February 6, 1990

INVENTOR(S) : Robert A. Black, Jr., et al.

It is certified that error appears in the above-identified patent and that said Letters Patent is hereby corrected as shown below:

On the title page:

In the References Cited Section, under U.S. PATENT DOCUMENTS, add the following:

| | | | |
|---|---|---|---|
| 3,577,011 | 4/1971 | Raffaelli | 307/252C |
| 3,768,024 | 10/1974 | Letosky | 328/150 |
| 3,950,640 | 5/1976 | Webb et al | 250/205 |
| 3,956,644 | 5/1976 | Zambre | 307/252 |
| 4,051,394 | 9/1977 | Tieden | 307/310 |
| 4,197,485 | 4/1980 | Nuver | 315/291 |
| 4,135,116 | 1/1979 | Smith | 315/158 |
| 4,229,669 | 10/1980 | Smith | 307/354 |
| 4,231,083 | 10/1981 | Matsuda et al | 363/135 |
| 4,322,767 | 3/1982 | El Hamamsy et al | 361/56 |
| 4,346,331 | 8/1982 | Hoge | 315/158 |
| 4,350,935 | 9/1982 | Spira | 315/291 |
| 4,376,969 | 3/1983 | Bedard et al | 363/78 |
| 4,414,493 | 11/1983 | Henrich | 315/308 |
| 4,455,509 | 6/1984 | Crum et al | 315/119 |
| 4,464,606 | 8/1984 | Kane | 315/158 |
| 4,476,414 | 10/1984 | Jimerson | 315/240 |
| 4,492,975 | 1/1985 | Yamada et al | 357/76 |
| 4,527,099 | 4/1985 | Capewell et al | 315/291 |
| 4,587,459 | 5/1986 | Blake | 315/158 |
| 4,598,198 | 7/1986 | Fayfield | 250/205 |
| 4,687,950 | 8/1987 | Howell | 307/642 |
| 4,697,122 | 9/1987 | Hoffer | 315/158 |

UNITED STATES PATENT AND TRADEMARK OFFICE
CERTIFICATE OF CORRECTION

PATENT NO. : 4,899,088

DATED : February 6, 1990

INVENTOR(S) : Robert A. Black, Jr., et al.

It is certified that error appears in the above-identified patent and that said Letters Patent is hereby corrected as shown below:

Column 6, line 51, delete "Positive" and insert --positive--.

Column 9, lines 6-7 after "respectively" insert a period.

Column 9, line 34, delete "When" and insert --when--.

Column 9, line 36 delete "With" and insert --with--.

Signed and Sealed this

Twenty-sixth Day of February, 1991

Attest:

HARRY F. MANBECK, JR.

*Attesting Officer*  *Commissioner of Patents and Trademarks*